(12) United States Patent
Martiny et al.

(10) Patent No.: US 11,347,910 B1
(45) Date of Patent: May 31, 2022

(54) COMPUTERIZED PREDICTION FOR DETERMINING COMPOSITE MATERIAL STRENGTH

(71) Applicant: MSC.Software Corporation, Newport Beach, CA (US)

(72) Inventors: Philippe Martiny, Chastre (BE); Jonathan H. Gosse, Issaquah, WA (US); Eddy J. Sharp, Seattle, WA (US); Laurent Adam, Esneux (BE); Roger Assaker, Bonnert (BE)

(73) Assignee: HEXAGON MANUFACTURING INTELLIGENCE, INC., Irvine, CA (US)

( * ) Notice: Subject to any disclaimer, the term of this patent is extended or adjusted under 35 U.S.C. 154(b) by 524 days.

(21) Appl. No.: 16/045,473

(22) Filed: Jul. 25, 2018

(51) Int. Cl.
*G06F 30/23* (2020.01)
*G06F 17/16* (2006.01)
*G06N 3/04* (2006.01)
*G06F 111/10* (2020.01)

(52) U.S. Cl.
CPC .............. *G06F 30/23* (2020.01); *G06F 17/16* (2013.01); *G06N 3/04* (2013.01); *G06F 2111/10* (2020.01)

(58) Field of Classification Search
CPC ...... G06F 30/23; G06F 17/16; G06F 2111/10; G06F 30/25; G06F 30/367; G06F 30/398; G06F 2111/00; G06F 2119/22; G06N 3/04

See application file for complete search history.

(56) References Cited

U.S. PATENT DOCUMENTS

| 5,419,200 | A  | * | 5/1995  | Burns ................... G01B 5/30 73/760 |
| 9,977,841 | B1 | * | 5/2018  | Assaker ................ G06F 30/23 |
| 2002/0152426 | A1 | * | 10/2002 | Loosen ................. G01N 3/08 714/26 |
| 2002/0178832 | A1 | * | 12/2002 | Sarabi .................. G06F 30/23 73/789 |
| 2003/0050728 | A1 | * | 3/2003  | Sarabi .................. B29C 45/76 700/201 |
| 2007/0100565 | A1 | * | 5/2007  | Gosse .................... G06F 30/23 702/34 |
| 2008/0015827 | A1 | * | 1/2008  | Tryon, III ............ G06F 11/008 703/2 |

(Continued)

OTHER PUBLICATIONS

Nettles, Alan T., "Allowables for Structural Composites", International Conference on Composites Engineering, Aug. 2004 (Year: 2004).*

(Continued)

*Primary Examiner* — Kamini S Shah
*Assistant Examiner* — Russ Guill
(74) *Attorney, Agent, or Firm* — Foley & Lardner LLP

(57) ABSTRACT

Examples described herein relate to apparatuses and methods for predicting strength of a coupon of composite material. A first critical damage event and strain and stress distributions of the coupon is determined by performing a finite element analysis (FEA) of a finite element model of the coupon. The first critical damage event is associated with the strain and stress distributions. The strain and stress distributions are received as inputs to at least one surrogate model. A final load corresponding to a final failure of the coupon is determined using the at least one surrogate model.

18 Claims, 7 Drawing Sheets

(56) References Cited

U.S. PATENT DOCUMENTS

| | | | | |
|---|---|---|---|---|
| 2008/0228680 | A1* | 9/2008 | Chen | G06N 3/0454 706/21 |
| 2009/0012749 | A1* | 1/2009 | Ornjanovic | G06F 30/23 703/1 |
| 2009/0144038 | A1* | 6/2009 | Rassaian | G06F 30/20 703/6 |
| 2009/0209944 | A1* | 8/2009 | Carlson | A61L 31/18 604/529 |
| 2012/0323538 | A1* | 12/2012 | Rassaian | G06F 30/15 703/2 |
| 2015/0170022 | A1* | 6/2015 | Malik | G06N 3/084 706/21 |
| 2016/0003344 | A1* | 1/2016 | Mapkar | F16H 57/037 428/35.8 |
| 2018/0073304 | A1* | 3/2018 | Dziekonski | E21B 17/01 |

OTHER PUBLICATIONS

Hassanien, Sherif et al. "On the Use of Surrogate Models in Reliability-Based Analysis of Dented Pipes", Proceedings of the 2016 11th International Pipeline Conference, Sep. 26-30, 2016 (Year: 2016).*

Nettles, Alan T., "Allowables for Structural Composites", International Conference on Composites Engineering (Year: 2004).*

Warner, J.E. et al. "Near Real-Time Probabilistic Damage Diagnosis Using Surrogate Modeling and High Performance Computing", American Institute of Aeronautics and Astronautics (Year: 2017).*

Akira Todoroki et al., "New surrogate model to predict fracture of laminated CFRP for structural optimization," 2011, Journal of Computational Science and Technology, vol. 5, No. 1, 12 pages (Year: 2011).*

Srinivasu Gangi Setti et al. "Artificial neural network approach for prediction of stress-strain curve of near b titanium alloy", 2014, Rare Metals, vol. 33, No. 3, 9 pages (Year: 2014).*

T. E. Tay et al., "Damage progression by the element-failure method (EFM) and strain invariant failure theory (SIFT)", 2005, Composites and Science Technology, vol. 65, pp. 935-944 (Year: 2005).*

Manoj Kumar Buragohain, "Composite Structures Design, Mechanics, Analysis, Manufacturing, and Testing,"2017, CRC Press, 761 pages (Year: 2017).*

R.S. Sandhu, "Ultimate strength analysis of symmetric laminates," 1974, Air Force Flight Dynamics Laboratory Wright-Patterson Air Force Base, 87 pages (Year: 1974).*

B. Peseux et al., "Equivalent Homogeneous Finite Element for Composite Materials Via Reissner Principle. Part I: Finite element for plates," 1991, International Journal for Numerical Methods in Engineering, vol. 31, 19 pages (Year: 1991).*

D.L. Bonanni et al., "Ply-level failure analysis of thick-section composite structures based on smeared finite element results," 1996, Journal of Thermoplastic Composite Materials, vol. 9, 10 pages (Year: 1996).*

L.N. McCartney, "Physically based damage models for laminated composites," 2003, Proceedings of the Institution of Mechanical Engineers, Part L: Journal of Materials: Design and Applications, vol. 217, 37 pages (Year: 2003).*

K.L. Goh et al., "Review: finite element analysis of stress transfer in short-fibre composite materials," 2004, Composites Science and Technology, vol. 64, pp. 1091-1100 (Year: 2004).*

* cited by examiner

COMPUTERIZED PREDICTION FOR DETERMINING COMPOSITE MATERIAL STRENGTH

BACKGROUND

Without implementing computerized simulations, strength of composite materials (e.g., a coupon made of the composite materials) is measured experimentally in a coupon test with a testing machine, which is time-consuming and expensive.

Computerized methods for determining the strength of a coupon are deficient in various aspects. For example, in the First Ply Failure approach, computerized simulations are executed with respect to a model of a coupon to determine an applied force or load corresponding to the first critical damage event (e.g., the first irreversible damage event), without predicting a final load corresponding to a final failure of the coupon. Therefore, the First Ply Failure approach is conservative and fails to provide relevant information concerning the final load.

In the Progressive Failure approach, computerized simulations are executed with respect to a model of a coupon to explicitly model damage phenomena (occurring after the first critical damage event) that lead to the final failure. Using computerized simulations to explicitly determine the final load by modeling the damage phenomena is computationally complex and expensive to execute. This is because the damage phenomena are complex, concurrent damage mechanisms that can be different from one coupon to another.

SUMMARY OF THE INVENTION

In some arrangements, a method for a computerized simulation platform to predict strength of a coupon of composite material includes determining a first critical damage event and strain and stress distributions of the coupon by performing a finite element analysis (FEA) of a finite element model of the coupon, wherein the first critical damage event is associated with the strain and stress distributions, receiving the strain and stress distributions as inputs to at least one surrogate model, and determining a final load corresponding to a final failure of the coupon using the at least one surrogate model.

In some arrangements, determining the first critical damage event and the strain and stress distributions includes determining, by the FEA as a response to an applied load, ply strains in the coupon as the composite material is considered as homogenous, applying, at selected locations in the coupon, transfer functions to the ply strains to determine fiber strains and stresses and matrix strains and stresses, determining one or more failure criteria in the coupon based on the fiber strains and stresses and matrix strains and stresses, and modifying the applied load in response to determining that none of the one or more failure criteria crosses a respective threshold.

In some arrangements, the strain and stress distributions include fiber strains and stresses and matrix strains and stresses.

In some arrangements, the method further includes receiving orientations of plies of the coupon as inputs to the at least one surrogate model, wherein the final load is determined based on the strain and stress distributions and the orientations.

In some arrangements, the method further includes receiving at least one of strength of a matrix associated with the coupon and strength of fiber material in the coupon, wherein the final load is determined based on the strain and stress distributions and at least one of the strength of the matrix and the strength of the fiber material.

In some arrangements, the strength of the matrix includes at least one of a critical matrix dilatational invariant and a critical matrix distortional invariant.

In some arrangements, the strength of the fiber material includes a critical fiber distortional invariant.

In some arrangements, the at least one surrogate model includes simple analytical formulas.

In some arrangements, the at least one surrogate model is determined using machine learning by an artificial neural network.

In some arrangements, the method further includes determining that a problem statement inputted by a user is outside of a domain of applicability of the at least one surrogate model, notifying the user that the problem statement is outside of the domain of applicability of the at least one surrogate model.

In some arrangements, the method further includes determining the final load includes determining variability of the final load, and based on the variability, determining at least one of an A-basis and a B-basis of the final load.

In some arrangements, the method further includes determining the at least one surrogate model based on at least one of physical experimental data and simulation results.

In some arrangements, the method further includes determining the at least one surrogate model based on information stored in a material data management tool or software.

In some arrangements, determining the final load corresponding to the final failure of the coupon using the at least one surrogate model includes performing another FEA of another finite element model of a portion of the coupon to obtain additional simulation results, and using the additional simulation results as additional inputs to the at least one surrogate model.

In some arrangements, another FEA is performed in the background, simultaneously with determining the final load using the at least one surrogate model.

In some arrangements, a non-transitory computer-readable medium having computer-readable instructions, such that when executed, causes a processor of a computerized simulation platform to predict strength of a coupon of composite material by determining a first critical damage event and strain and stress distributions of the coupon by performing a FEA of a finite element model of the coupon, wherein the first critical damage event is associated with the strain and stress distributions, receiving the strain and stress distributions as inputs to at least one surrogate model, and determining a final load corresponding to a final failure of the coupon using the at least one surrogate model.

In some arrangements, the processor is caused to determine the first critical damage event and the strain and stress distributions includes determining, by the FEA as a response to an applied load, ply strains in the coupon as the composite material is considered as homogenous, applying, at selected locations in the coupon, transfer functions to the ply strains to determine fiber strains and stresses and matrix strains and stresses, determining one or more failure criteria in the coupon based on the fiber strains and stresses and matrix strains and stresses, and modifying the applied load in response to determining that none of the one or more failure criteria crosses a respective threshold.

In some arrangements, the strain and stress distributions include fiber strains and stresses and matrix strains and stresses.

In some arrangements, the processor is further configured to receive orientations of plies of the coupon as inputs to the at least one surrogate model, wherein the final load is determined based on the strain and stress distributions and the orientations.

In some arrangements, a computerized simulation platform configured to predict strength of a coupon of a composite material, the computerized simulation platform includes a processing circuit configured to determine a first critical damage event and strain and stress distributions of the coupon by performing a FEA of a finite element model of the coupon, wherein the first critical damage event is associated with the strain and stress distributions, receive the strain and stress distributions as inputs to at least one surrogate model, and determine a final load corresponding to a final failure of the coupon using the at least one surrogate model.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

The detailed description set forth below in connection with the appended drawings is intended as a description of various aspects of the present disclosure and is not intended to represent the only aspects in which the present disclosure can be practiced. Each aspect described in this disclosure is provided merely as an example or illustration of the present disclosure, and should not necessarily be construed as preferred or advantageous over other aspects. The detailed description includes specific details for providing a thorough understanding of the present disclosure. However, it will be apparent to those skilled in the art that the present disclosure can be practiced without these specific details. In some instances, structures and devices are shown in block diagram form in order to avoid obscuring the concepts of the present disclosure. Acronyms and other descriptive terminology can be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more aspects.

Arrangements described herein relate to systems, apparatuses, methods, and non-transitory computer-readable medium for implementing virtual coupon testing by numerically predicting strength of composite materials (e.g., coupons made of the composite materials) using a computerized platform. The disclosed arrangements are faster and more accurate as compared to the traditional methods. In addition, the disclosed arrangements allow easily controllable mesh sensitivity.

Figure 1:
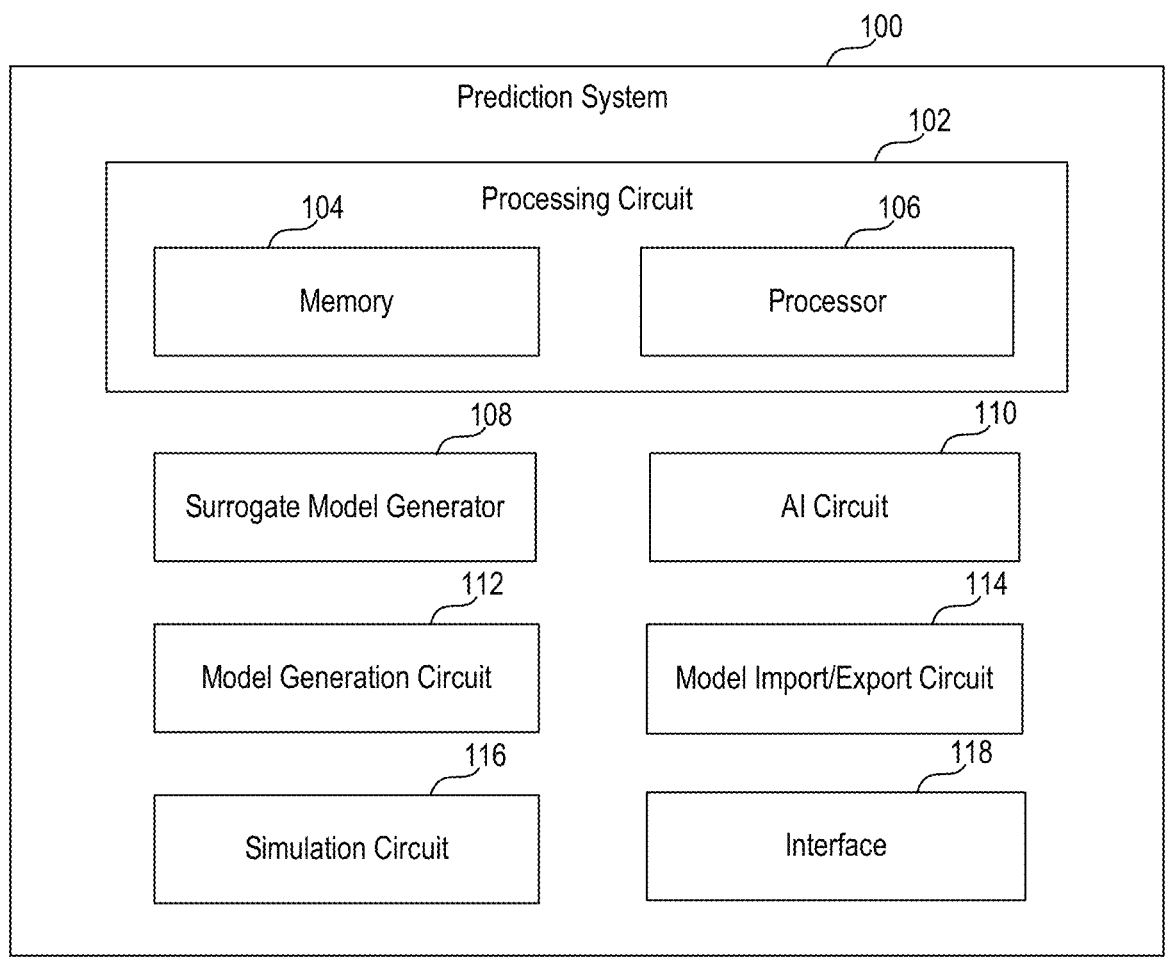
FIG. 1 is a block diagram illustrating an example of a prediction system, according to various examples.

FIG. 1 is a block diagram illustrating an example of a prediction system 100 according to various arrangements. Referring to FIG. 1, the prediction system 100 is configured to determine a first critical damage event (e.g., the first irreversible damage event) for a model (e.g., a finite element model) of a coupon using Finite Element Analysis (FEA). The prediction system 100 is configured to predict coupon strength (e.g., a final load associated with a final failure) for the coupon based on the first critical damage event and at least one surrogate model.

The prediction system 100 includes at least a processing circuit 102, a surrogate model generator 108, an artificial intelligence (AI) circuit 110, a model generation circuit 112, a model import/export circuit 114, a simulation circuit 116, and an interface 118 for implementing features described herein. In some arrangements, the prediction system 100 is a part of a workstation computer or another suitable computing device. The prediction system 100 may include other devices such as but not limited to, a network system, wireless or wired communications system, printers, and/or the like not shown for brevity.

The processing circuit 102 includes a memory 104 and a processor 106. The processor 106 includes any suitable data processing device, such as a general-purpose processor (e.g., a microprocessor). In the alternative, the processor 106 can be any conventional processor, controller, microcontroller, or state machine. The processor 106 can be implemented as a combination of computing devices, e.g., a combination of a Digital Signal Processor (DSP) and a microprocessor, a plurality of microprocessors, at least one microprocessor in conjunction with a DSP core, or any other such configuration. For example, the processor 106 may be, but is not limited to being, an Intel® designed processor, AMD® designed processor, Apple® designed processor, QUAL-COMM® designed processor, or ARM® designed process.

The memory 104 (or storage device) can be operatively coupled to the processor 106 and can include any suitable device for storing software instructions and data for controlling and use by the processor 106 to perform operations and functions described herein. Examples of the memory 104 include, but not limited to, Random Access Memory (RAM), Read Only Memory (ROM), floppy disks, hard disks, dongles or other Recomp Sensor Board (RSB) connected memory devices, or the like. The memory 104 can include non-transitory storage media that is configured to store information and instructions pertinent to the operation of the processor 106.

The memory 104 can send data to or receive data from the processor 106 and/or each of the circuits/components 108-118 in the prediction system 100. In some examples, the memory 104 can be a remote storage device that stores data for the prediction system 100 (or only the processing circuit 102) in a different node of a network than that on which the processing circuit 102 and/or the prediction system 100 reside. In some examples, the memory 104 can be located on the same computer system (e.g., within the same node of the network) as the processing circuit 102 and/or the prediction system 100. In some examples, one or more of the circuits 108-118 can be implemented with a dedicated memory unit that is separate from the memory 104.

The processing circuit 102 can implement or otherwise provide processing capabilities to one or more of the circuits 108-118 in the prediction system 100 for performing the features described herein. For example, the processing circuit 102 can implement the surrogate model generator 108 to generate at least one surrogate model to determine the coupon strength (the final load) of a coupon in the manner described.

The processing circuit 102 can implement the AI circuit 110. The AI circuit 110 is configured to provide an AI that can accept parameters (e.g., strain and stress distributions) associated with the first critical damage event as inputs and output predicted coupon strength of the coupon. The AI circuit 110 can predict the coupon strength based on the at least one surrogate model provided by the surrogate model generator 108. The AI circuit 110 may include suitable memory devices for storing one or more suitable predictive surrogate models based on which the AI circuit 110 predicts the coupon strength. The AI circuit 110 can also train the at least one surrogate model using machine learning algorithms in the manner described. In that regard, the AI circuit 110 and the surrogate model generator 108 can be operatively coupled together to generate the at least one surrogate model.

The processing circuit 102 can implement the model generation circuit 112. The model generation circuit 112 receives user input from the interface 118 and converts the user input into a model to be simulated by the simulation circuit 116. The model generation circuit 112 can generate at least a finite element model of a physical object. For instance, examples of the physical object include but are not limited to, a composite material.

In addition, the processing circuit 102 can implement the model import/export circuit 114 to import and/or export models. In some examples, the model import/export circuit 114 imports a model from another memory device or another system. The model import/export circuit 114 can send model information corresponding to the imported model to one or more of the circuits/components 108-112 and 116-118 in the prediction system 100. The model import/export circuit 114 can export the model to a memory device or another system. The model import/export circuit 114 can export the model via a suitable computer network to a machine to automatically manufacture products represented by the model.

Furthermore, the processing circuit 102 can implement the simulation circuit 116. For example, the simulation circuit 116 can receive a model (e.g., a finite element model of a coupon of a composite material) from the model generation circuit 112 and/or the model import/export circuit 114 to perform simulations. The simulations that can be performed by the simulation circuit 116 include but are not limited to, FEA simulations.

The interface 118 can include at least one input device for receiving user input from a user and at least one display device for outputting information to the user. For example, the input device can include a computer with a monitor, keyboard, keypad, mouse, joystick, touch screen display, or other input devices performing a similar function. The keyboard can include alphanumeric and other keys, and can be connected to processing circuit 102 for communicating information and command selections. The input device can include a touch screen interface or movement sensing interface that can be combined with, or separated from, the display device of the interface 118. The input device can include a cursor control device, such as, but not limited to, a mouse, trackball, touch screen, motion sensor, cursor direction keys, and the like. Such input device can control cursor movement on the display device. The display device of the interface 118 can be any type of display (e.g., Cathode Ray Tube (CRT) display, Liquid Crystal Display (LCD), etc.) configured to provide audio and/or visual output to the user.

Figure 2A:
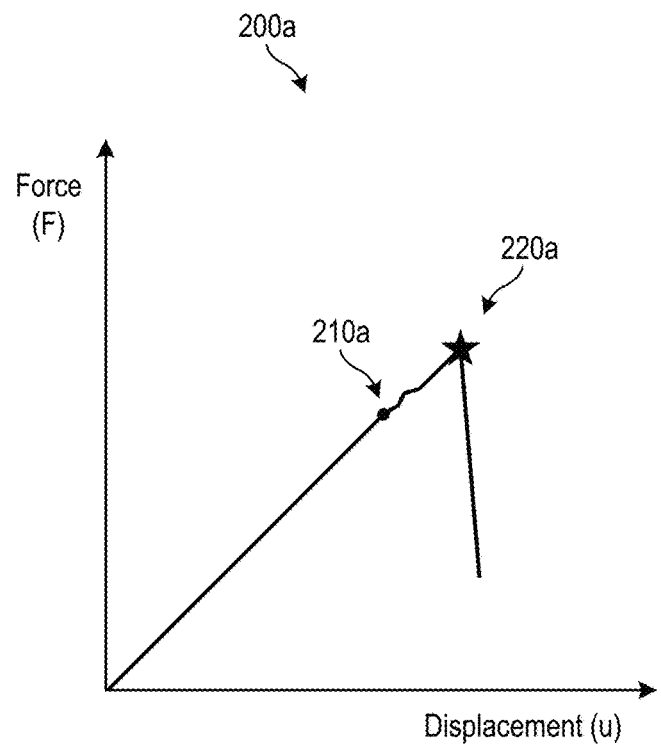
FIG. 2A is a graph (force as a function of displacement) illustrating a response of a coupon of a composite material when a force is applied to the coupon, according to an example.
Figure 2B:
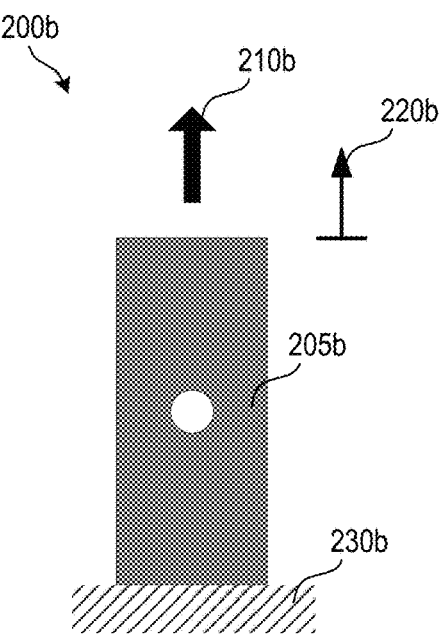
FIG. 2B is a diagram illustrating application of a force to a coupon of a composite material to cause displacement in the coupon, according to an example.

FIG. 2A is a graph 200*a* (force as a function of displacement) illustrating an example of a response of a coupon 205*b* (FIG. 2B) of a composite material when a force 210*b* (FIG. 2B) is applied to the coupon 205*b*, according to an example. FIG. 2B is a diagram 200*b* illustrating application of a force 210*b* to a coupon 205*b* of a composite material to cause displacement 220*b* in the coupon 205*b*, according to an example. Referring to FIGS. 1-2B, the graph 200*a* and the diagram 200*b* correspond to each other. As shown, the coupon 205*b* has an open-hole configuration. The coupon 205*b* is being displaced by the force 210*b*, an example of which is an applied mechanical force or load. As shown, the coupon 205*b* is fixed or otherwise attached to an anchor 230*b* on one end and experiences (e.g., pulled by) the force 210*b* on an opposite end. In other examples not shown, the coupon 205*b* may be compressed toward the anchor 230*b*. The displacement 220*b* (corresponding to the x-axis in the graph 200*a*) caused by the force 210*b* (corresponding to the y-axis in the graph 200*a*) is felt by the coupon 205*b*, exhibiting behaviors demonstrated in the graph 200*a*. As shown, the response may be linear until a first critical damage event 210*a* (or a first irreversible damage event), at which point the coupon 205*b* begins to experience irreversible damage. At a final failure 220*a*, the coupon 205*b* experiences an unstoppable, abrupt failure. Between the first critical damage event 210*a* and the final failure 220*a*, the response is associated with a complex damage evolution phenomena.

Using computerized simulations (e.g., FEA) to explicitly determine the final load by modeling the complex damage evolution phenomena is computationally complex and expensive to execute. Thus, to improve upon existing prediction mechanisms, at least one surrogate model instead of FEA is used to arrive at the final failure 220*a* from the first critical damage event 210*a*, thus reducing complexity and cost.

A coupon (e.g., the coupon 205*b*) as referred to herein may exhibit various attributes such as but not limited to, coupon geometries, loading conditions, and test conditions. The attributes may be defined in international and/or industry standards. Examples of the standards include but are not limited to, American Society for Testing and Materials (ASTM), International Standards Organization (ISO), and the like. Examples of loading conditions include but are not limited to, tensile loading, compression loading, and the like. Examples of test conditions include but are not limited to, temperature, humidity, and the like).

Figure 3:
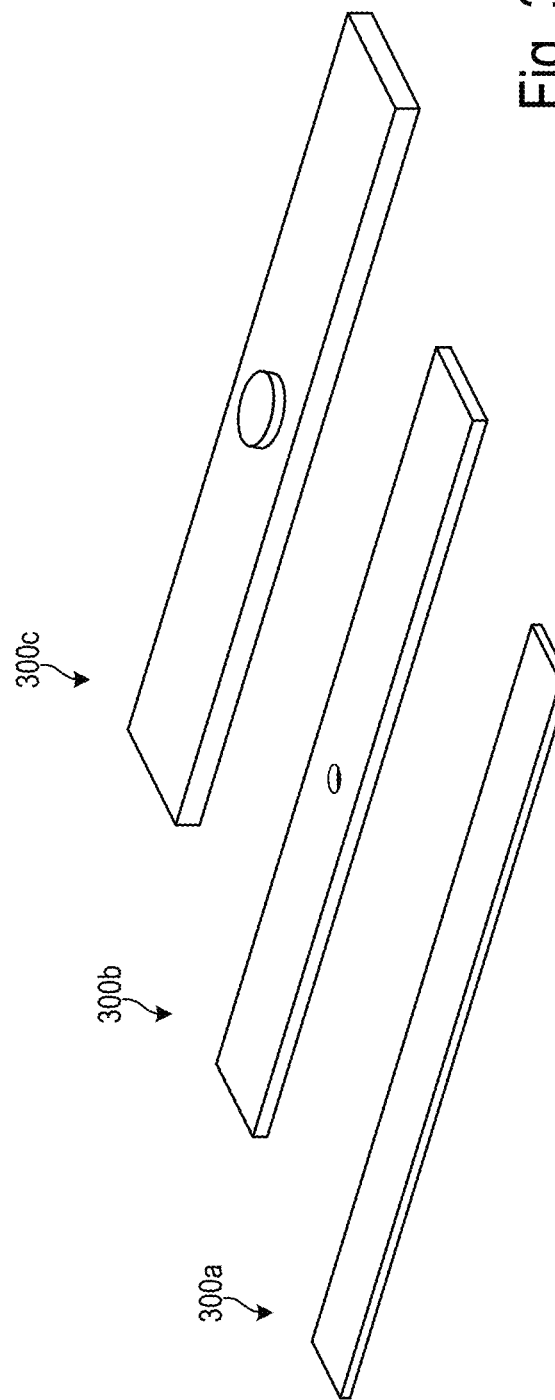
FIG. 3 is a diagram illustrating an example of a coupon having an unnotched configuration, an example of a coupon having an open-hole configuration, and an example of a coupon having a filled-hole configuration.

Examples of coupon geometries include but are not limited to, an unnotched configuration, an open-hole configuration, a filled-hole configuration, a bearing configuration, and a compression-after-impact configuration. In that regard, FIG. 3 is a diagram illustrating an example of a coupon having an unnotched configuration 300*a*, an example of a coupon having an open-hole configuration 300*b*, and an example of a coupon having a filled-hole configuration 300*c*.

The coupon of the composite material may be a stack of multiple layers of materials. Each layer of material is referred to as a ply. In some arrangements, each ply includes continuous fibers such as but not limited to, continuous carbon fibers, continuous glass fibers, and/or the like. For each ply, continuous fibers are embedded in a polymeric material or matrix.

Figure 4:
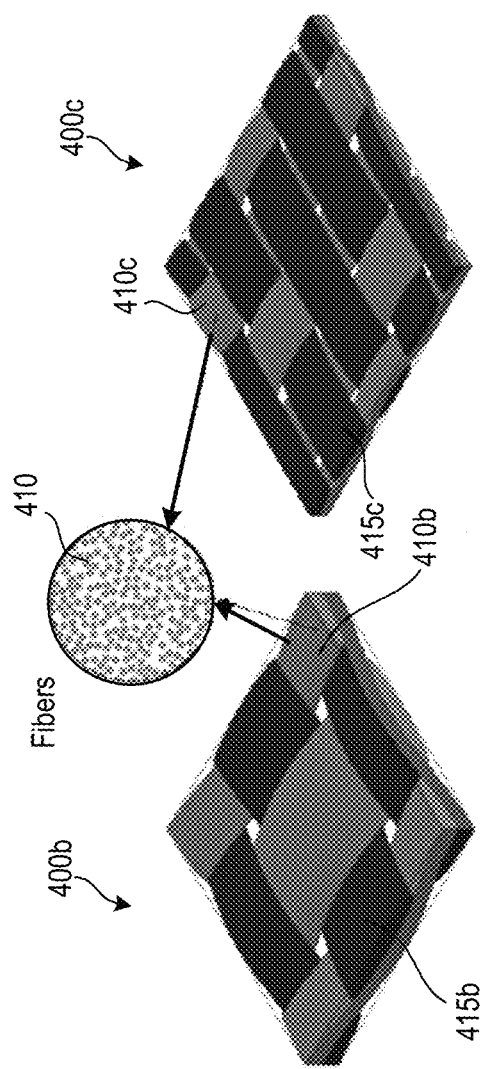
FIG. 4 is a diagram illustrating an example of a ply having aligned configuration, an example of a ply having a woven configuration, and another example of a ply having a woven configuration.
Figure 4:
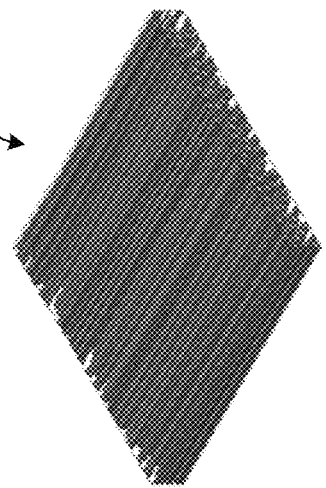

FIG. 4 is a diagram illustrating an example of a ply 400*a* having aligned configuration, an example of a ply 400*b* having a woven configuration, and another example of a ply 400*c* having a woven configuration. Referring to FIGS. 1-4, the continuous fibers of the ply 400*a* are straight and aligned in a particular direction. Thus, the ply 400*a* may be referred to as a unidirectional ply. In some examples, the continuous fibers of a ply can be woven together to form a particular weave pattern. Such a ply may be referred to as a woven ply, and may typically contain 3,000-12,000 individual continuous fibers. The ply 400*b* has a plain weave pattern, and includes yarns (e.g., yarns 410*b* and 415*b*). The ply 400*c* has a satin H3 weave pattern, and includes yarns (e.g., yarns 410*c* and 415*c*). Each yarn (e.g., yarn 410*b* or 410*c*) includes fibers 410.

Figure 5B:
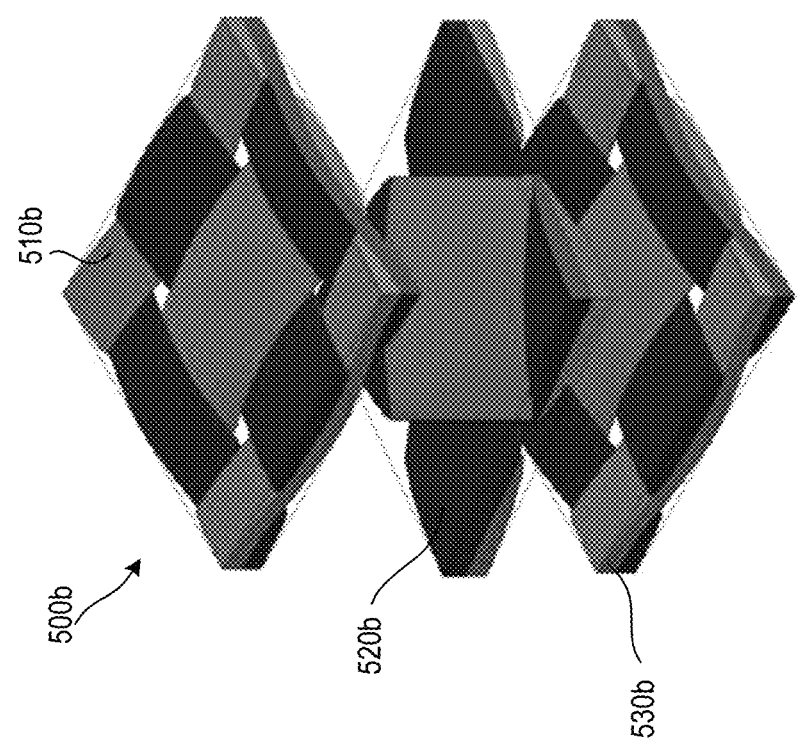
FIG. 5B is a diagram illustrating an example of a coupon made of woven plies.
Figure 5A:
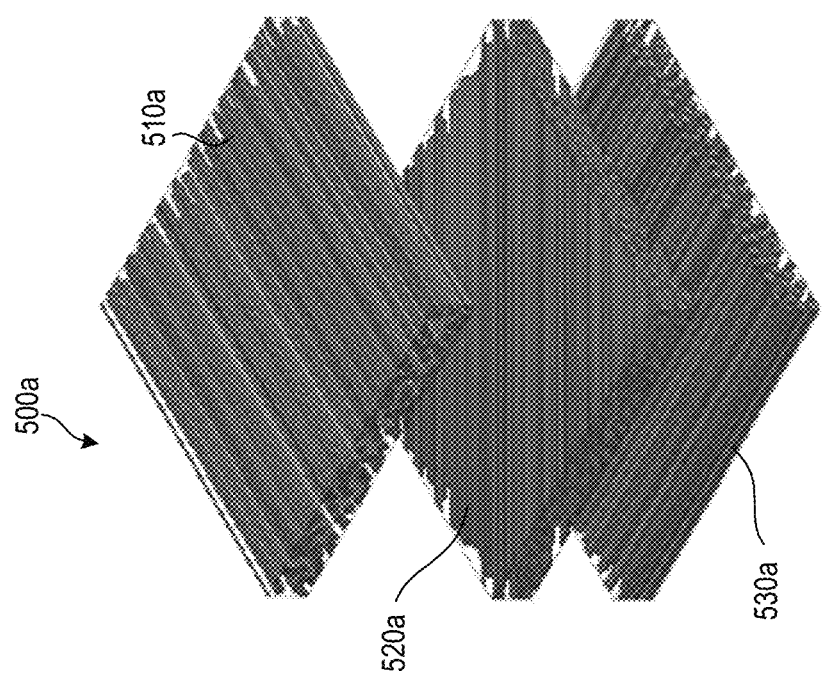
FIG. 5A is a diagram illustrating an example of a coupon made of unidirectional plies.

FIG. 5A is a diagram illustrating an example of a coupon 500*a* made of unidirectional plies 510*a*-530*a*. FIG. 5B is a diagram illustrating an example of a coupon 500*b* made of woven plies 510*b*-530*b*. Referring to FIGS. 1-5B, the coupon 500*a* or 500*b* of the composite material includes multiple plies 510*a*-530*a* or 510*b*-530*b*, respectively. While three plies 510*a*-530*a* or 510*b*-530*b* are shown for each of the coupons 500*a* and 500*b*, respectively, one of ordinary skill in the art can appreciate that more or less plies can be included in a coupon. Generally, two or more plies in a same coupon may have different orientations (e.g., different fiber alignments and directions), different fiber architectures (e.g., different one of a unidirectional architecture and woven architecture), and/or different weave patterns. For example, the plies 510*a*-530*a* of the coupon 500*a* have different orientations. The plies 510*b* and 520*b* of the coupon 500*b* have different orientations and different weave patterns. In an example in which one of the plies 510*a*-530*a* and one of the plies 510*b*-530*b* are included in a same coupon, that coupon has plies with different fiber architectures. The definition of the orientations of the different plies is referred to as a stacking sequence or lay-up. Different plies may be consolidated according to the stacking sequence during a manufacturing process. In that regard, a resulting matrix material is continuous from one ply to the other, ensuring adhesion between the plies of a coupon. While the present disclosure uses coupons having unidirectional plies as illustrative examples, one of ordinary skill in the art can appreciate that the disclosed arrangements can be likewise applied to coupons with woven plies.

Figure 6A:
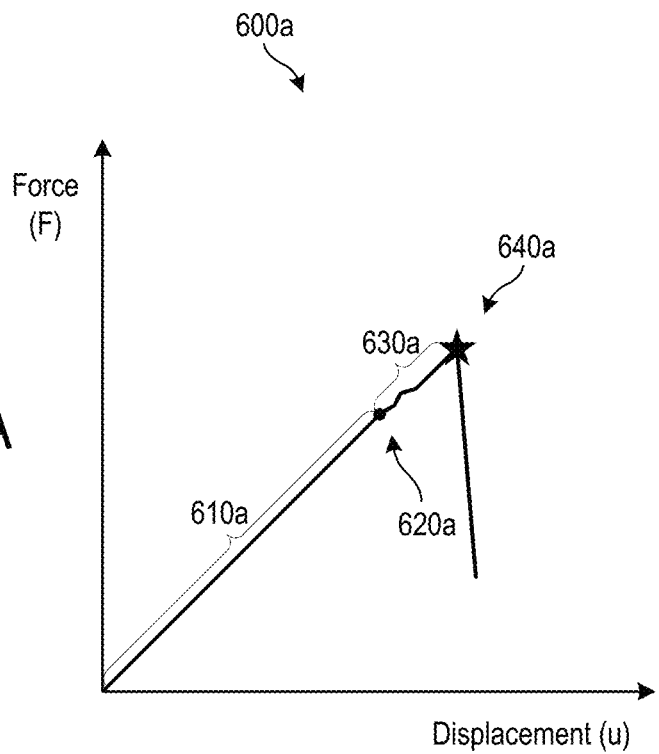
FIG. 6A is a graph (force as a function of displacement) illustrating a response of a coupon of a composite material when a force is applied to the coupon, according to an example.
Figure 6B:
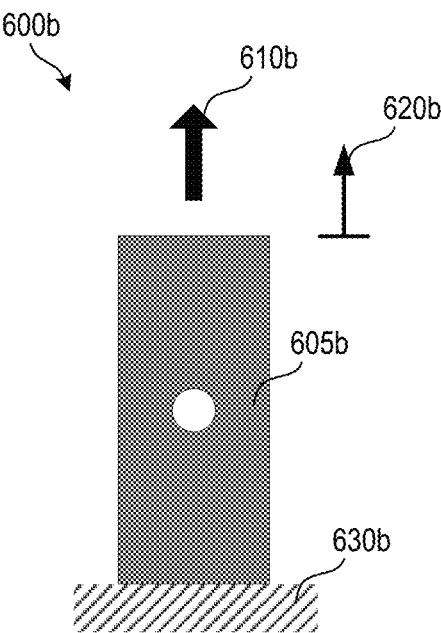
FIG. 6B is a diagram illustrating application of a force to a coupon of a composite material to cause displacement in the coupon, according to an example.

FIG. 6A is a graph 600*a* (force as a function of displacement) illustrating an example of a response of a coupon 605*b* (FIG. 6B) of a composite material when a force 610*b* (FIG. 6B) is applied to the coupon 605*b*, according to an example. FIG. 6B is a diagram 600*b* illustrating application of the force 610*b* (e.g., an applied mechanical load or force) to the coupon 605*b* of the composite material to cause displacement 620*b* in the coupon 605*b*, according to an example. Referring to FIGS. 1-6B, the graph 600*a* and the diagram 600*b* correspond to each other. As shown, the coupon 605*b* has an open-hole configuration. The coupon 605*b* is being displaced by the force 610*b*, in the manner described. As shown, the coupon 605*b* is fixed or otherwise attached to an anchor 630*b* on one end and experiences (e.g., pulled by) the force 610*b* on an opposite end. In other examples not shown, the coupon 605*b* may be compressed toward the anchor 630*b*.

Initially, at 610*a*, the imposed displacement 620*b* of the coupon 605*b* increases linearly as the force 610*b* increases. The linear relationship is reversible. For example, before the response reaches 620*a*, if the imposed displacement 620*b* becomes zero, the corresponding applied force 610*b* should also be zero, and if the imposed displacement 620*b* is increased to a non-zero value, then the response of the coupon 605*b* is consistent with 610*a*. In other words, before reaching 610*b*, the process of forcing the imposed displacement 620*b* at 610*a* is reversible. Thus, the portion of the response corresponding to 610*a* may be referred to as a linear response.

In some examples not shown in FIG. 6A, after the initial linear relationship at 610*a* and before 620*a*, the imposed displacement 620*b* may increase in a nonlinear, irreversible manner as the force 610*b* increases, without damage to the coupon 605*b*. In other words, the behavior of the coupon 605*b* is modified as compared to 610*a* due to the applied force 610*b*, but nothing in the coupon 605B has broken yet.

At 620*a*, the coupon 605*b* begins to become damaged as the force 610*b* and the imposed displacement 620*b* increase. In some instances, 620*a* is referred to as the first critical damage event. For example, one or more plies in the coupon 605*b* may start to break, such that a crack may appear in a matrix, a fiber of the coupon 605*b* may break, a fiber may de-bond or break from a matrix, and the like. Such damages may begin to affect the response of the coupon 605*b* at and after 620*a*. Thus, certain strain and stress distributions of the coupon 605*b* are associated with the first critical damage event. Thereafter, the damage may propagate from an initial damage site (e.g., in one ply) to other parts of the coupon 605*b* (e.g., to other pliers and/or to interfaces between the plies) as the force 610*b* and the imposed displacement 620*b* increase, forming new damage sites within the same ply and/or in other plies. This causes increased degradation to a load-carrying capability of the coupon 605*b* at 630*a*, until the coupon 605*b* finally fails at 640*a*. As shown, 630*a* is the portion of the response between 620*a* and 640*a*. In some instances, 630*a* is referred to as a damage growth portion of the response, corresponding to complex damage evolution phenomena. At 640*a*, a significant load drop is experienced. That is, the coupon 605*b* cannot withstand a higher load than the force 610*b* reached at 640*a*. In some instances, 640*a* is referred to as the final failure. The final failure is associated with a final load, which is the force 610*b* corresponding to the final failure.

The damage mechanisms and associated damage progression can vary depending on the loading conditions, the coupon geometry, the materials (polymer type, fiber type, and the like), the fiber architecture (unidirectional plies, weave patterns, and the like), the stacking sequence, the type of test (unnotched, open hole, filled hole, bearing, and the like), the loading conditions (tensile, compression, and the like) or the test conditions (room temperature dry, elevated temperature wet, and the like). The amount of damage accumulated before the final failure can also vary. Therefore, the response characteristics associated with 610*a*-640*a* can also vary.

Figure 7:
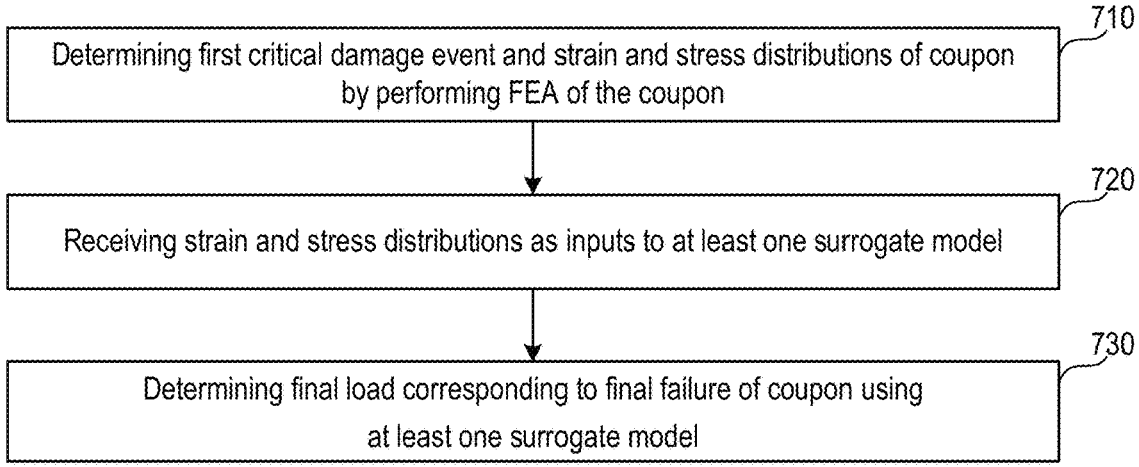
FIG. 7 is a flowchart diagram illustrating an example of a method for predicting the final load.

Arrangements described herein relate to predicting a final load corresponding to the final failure (e.g., at 640*a*) using one or more surrogate models in combination with FEA. In that regard, FIG. 7 is a flowchart diagram illustrating an example of a method 700 for predicting the final load. Referring to FIGS. 1-7, the method 700 is implemented by the prediction system 100 to predict strength of a coupon of a composite material.

At 710, the simulation circuit 116 determines a first critical damage event (e.g., at 620*a*) and strain and stress distributions of a coupon (e.g., the coupon 605*b*), for example, by performing a FEA on a finite element model of the coupon. The simulation circuit 116 receives a finite element model of the coupon from the model generation circuit 112 and/or the model import/export circuit 114. The first critical damage event is associated with the strain and stress distributions in the manner described.

In some examples, a rather simple finite element model can be used to compute the strains and stresses in the coupon to predict the occurrence of the first critical damage event, which may occur anywhere in the coupon. As described, that model may account for the strains and stresses induced by one or both of a manufacturing process and an applied mechanical load (e.g., the force 610*b*). The first critical damage event can be predicted by examining the strain invariants at different locations in a matrix and in identified critical fibers everywhere in the coupon (e.g., in each and every ply). As discussed in further detail herein, the local strains and stresses in the matrix and in the fibers are determined from the global ply strains using transfer functions precomputed with finite element models of RVEs of the ply material.

Figure 8:
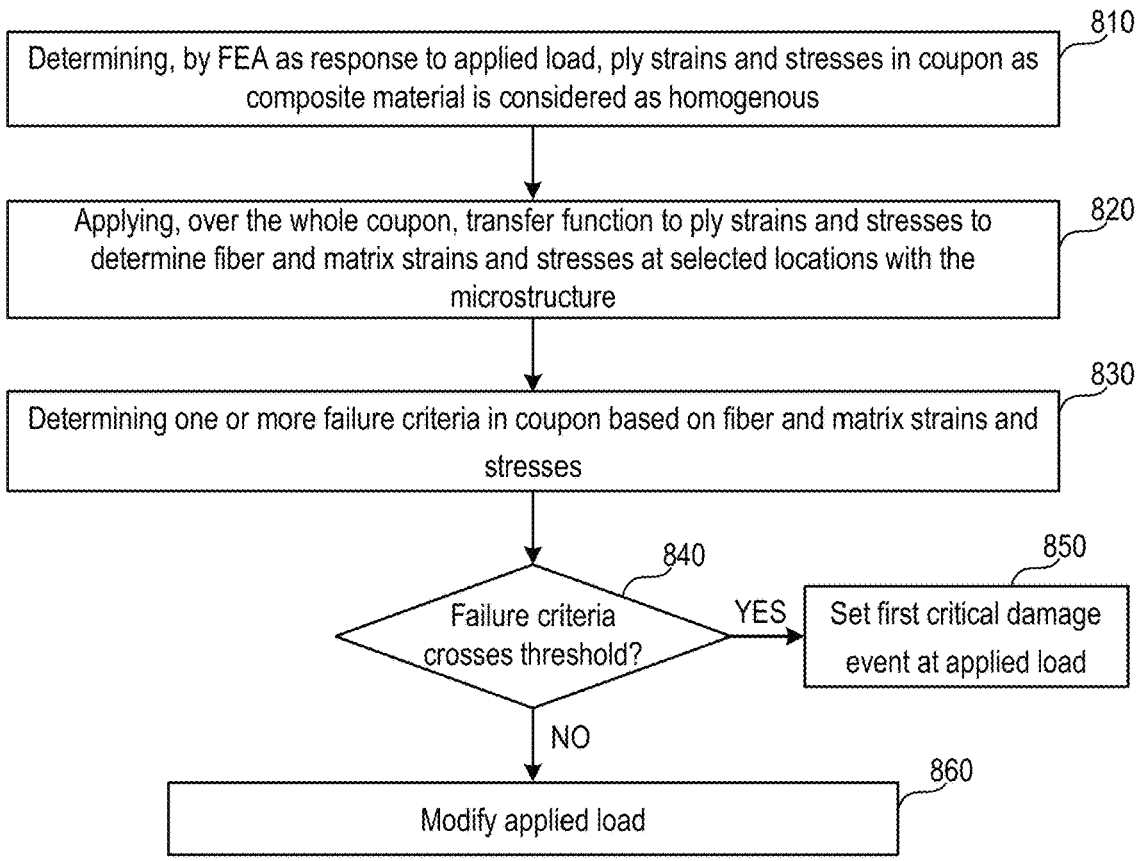
FIG. 8 is a flowchart diagram illustrating an example of a method for determining a first critical damage event and strain and stress distributions associated with the first critical damage event.

In some arrangements, determination of the first critical damage event and the strain and stress distributions associated thereof can be implemented in various suitable manners such as but not limited to, a method 800 as shown in FIG. 8. In that regard, FIG. 8 is a flowchart diagram illustrating an example of the method 800 for determining the first critical damage event (e.g., at 620*a*) and strain and stress distributions associated thereof.

At 810, the simulation circuit 116 determines ply strains and stresses in the coupon (as the composite material is considered as homogenous) by FEA as a response to an applied load (the force 610*b*). The ply strains and stresses for the composite material (considered as homogenous) refer to strains and stresses in the different layers or plies of the composite material when the composite material is considered as homogenous within these layers. The composite material can be considered as homogenous because details of the fibers and details of the matrices are not modeled in a finite element representation of the coupon. In some examples, homogenized, linear elastic properties are used to model behaviors of the composite material. That is, an assumption can be made that there is no damage anywhere in the composite material that affects the behaviors of the composite material. The ply strains and stresses are computed using FEA (e.g., based on a finite element mesh model) for each ply. At first, the applied load may be sufficiently small to avoid causing any damage in the coupon.

In some arrangements, the coupon is first subject to a temperature decrease from a temperature at which the coupon is manufactured to a test temperature. During the temperature decrease phase, the coupon is supported in a manner so as not restrict any translational or rotational motion (e.g., the coupon is not subject to any external mechanical load such as the force 610*b*). In this manner, the strains and stresses caused by a manufacturing process can be determined. Subsequently, the coupon is subjected to an external mechanical load (e.g., the force 610*b*) that represents the mechanical force applied to the coupon. In this manner, the strains and stresses caused by the applied-load test can be determined.

Figure 9:
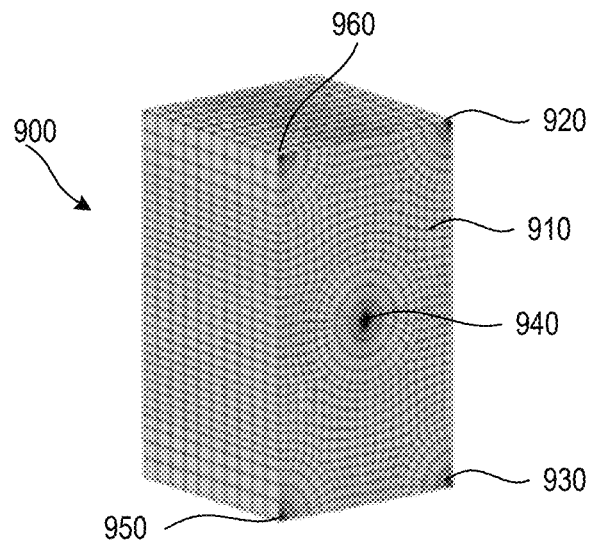
FIG. 9 shows an example of a finite element model of a Representative Volume Element (RVE) of a ply material used to compute strains and stresses at selected locations of the ply material.

At 820, the simulation circuit 116 applies transfer functions to the ply strains and stresses determined at 810, to determine fiber and matrix strains and stresses at selected locations within a microstructure of the composite material. A microstructure of any solid is an assembly of features that make up the whole of the solid. In the present context the microstructure of interest is comprised of fibers and matrix where the fibers are arranged in specific patterns (the fibers and the matrix are the features of interest). This is performed over the whole coupon, for all plies. The selected locations may be identified as critical locations by any suitable methods. In some arrangements, the transfer functions are pre-computed with finite element models of an RVE of the ply material. From the ply strains and stresses, the simulation circuit 116 computes the fiber and matrix strains and stresses at certain selected locations within the underlying microstructure as depicted, for example, in FIG. 9. FIG. 9 shows an example of a portion of finite element model 900 of an RVE of the ply material used to compute the strains and stresses at selected locations within the fiber and within the matrix. The selected locations may be on a cross-sectional surface 910, such that the selected locations are within the entire finite element model 900. The selected locations may be at one of the fibers 920-960 and/or at the space between the fibers 920-960.

At 830, the simulation circuit 116 determines one or more failure criteria in the coupon based on the fiber and matrix strains and stresses determined at 820. The failure criteria may be known to be critical for the coupon geometry and type of load that is being simulated. The one or more failure criteria are computed everywhere in the model of the coupon, in all plies (e.g., with respect to each ply). Each failure criteria may be associated with a damage mechanism. Examples of the failure criteria include but are not limited to, a matrix dilation failure criterion, a matrix distortion failure criterion, a fiber distortion failure criterion, and the like.

At 840, the simulation circuit 116 checks each of the one or more failure criteria to see if a respective threshold has been crossed. Crossing a respective threshold indicates that the failure criteria is beginning to cause failure. The critical threshold value associated with the matrix dilatational failure criterion (e.g., a first strain invariant of matrix strains) is the critical matrix dilatational invariant. The critical threshold value associated with the matrix distortion failure criterion (e.g., a second strain invariant of matrix strains) is the critical matrix distortional invariant. The critical threshold value associated with the fiber distortion failure criterion (e.g., a second strain invariant of fiber strains) is the critical fiber distortional invariant.

Responsive to determining that at least one of the one or more failure criteria cross a respective threshold (840:YES), the simulation circuit 116 sets the first critical damage event at the applied load, at 850. On the other hand, responsive to determining the one or more failure criteria do not cross respective thresholds (840:NO), the simulation circuit 116 modifies the applied load (e.g., the force 610*b*) at 860. The method 800 returns to block 810 with the modified applied load. In other words, each time the amplitude of the applied load is modified (e.g., increased or decreased), blocks 810-840 are iterated. The iterations continue until one of the failure criteria crosses the threshold for the first time anywhere in the coupon. Hence, 840:YES may correspond to the first critical damage event (e.g., at 620*a*). The first critical damage event is defined as the starting point of complex damage evolution mechanisms significantly affecting the response of the coupon to the applied load, rendering assumptions made in blocks 810-830 invalid.

Returning to 720, the AI circuit 110 receives the strain and stress distributions as inputs to at least one surrogate model. At 730, the AI circuit 110 determines a final load corresponding to a final failure of the coupon using the at least one surrogate model. To predict the behavior of the coupon beyond the first critical damage event, the rather simple finite element model used at 710 may not be sufficient to output meaningful information regarding the complex damage mechanisms. Thus, the arrangements disclosed herein use at least one surrogate model (instead of a finite element model) to predict the final load corresponding to the final failure.

A surrogate model includes a set of mathematical functions that approximate the response of a much more complex system, including the complex damage evolution mechanisms occurring after the first critical damage event. A surrogate model may refer to one or more surrogate models that are used in conjunction with one another to predict the final load.

Various input parameters and quantities can be fed into the surrogate model. Examples of such inputs include but are not limited to ply strains and stresses per ply, fiber strains and stresses per ply at selected locations with the microstructure, and matrix strains and stresses per ply at selected locations with the microstructure, and the like at the applied load commensurate with the first critical damage event. That is, the inputs to the surrogate model include fiber/matrix strains and stresses determined for a given applied load that causes the failure criteria crossing the threshold (840:YES). In that regard, the fiber strains and stresses per ply and matrix strains and stresses per ply (as well as other similar parameters) may be referred to as strain and stress distribution. In other words, the fiber strains and stresses, and matrix strains and stresses at different locations in different plies determined as the first critical damage event occurs can be used to predict an amount of additional applied load that can be withstood by the coupon after that first critical damage event and before the final failure.

In some arrangements, the fiber strains and stresses, and the matrix strains and stresses for everywhere in the coupon (e.g., for each ply) are used as inputs to the surrogate model. In other arrangements, the fiber strains and stresses, and matrix strains and stresses for selected plies or for selected portions of the coupon are used as inputs to the surrogate model.

Additional inputs to the surrogate model include but are not limited to, orientations of the different plies in the coupon, strengths of the matrix and fiber material, and the like. The orientations for the different plies are useful as inputs to the surrogate model due to relationships between the orientations and the applied loading that can be withstood by the coupon. The strength of the matrix can be approximated by the critical threshold values such as but not limited to, the critical matrix dilatational invariant, the critical matrix distortional invariant, and the like. The strength of the fiber material can be approximated by the critical threshold values such as but not limited to, the critical fiber distortional invariant, and the like.

In some examples, the predicted coupon strength, $F_u$, can be determined using the following expression:

$$F_u = \alpha \times F_1 \quad (1)$$

where $F_1$ is the applied load that induced the first critical damage event and a is a coefficient (e.g., a single scalar value) computed by the surrogate model based on the inputs described herein.

In some examples, the predicted coupon strength, $F_u$, can be determined using another expression:

$$F_u = F_1 + F_2 \quad (2)$$

where $F_2$ is the additional applied load computed by the surrogate model based on the inputs described herein.

In some arrangements, the surrogate model includes analytical formulas and conditions embodied in simple analytical formulas. In one example involving an open-hole coupon (e.g., the coupon 605*b*) that is subject to tensile loading, if the largest maximum matrix distortional invariant for all plies is twice the smallest maximum matrix distortional invariant for all plies, the scalar a in expression (a) can be set to equal the ratio of the largest maximum matrix distortional invariant to smallest maximum matrix distortional invariant. Such simple analytical formulas may be formulated by a human operator based on data. Such surrogate models can be referred to as Engineering Intelligence (E.I.) models.

In some arrangements, the surrogate model corresponds to an artificial neural network or another suitable Artificial Intelligence (A.I.) apparatus. Instead of simple analytical formulae, the artificial neural network includes mathematical functions that need to be trained by a computer program based on data. The amount of data needed for this approach may be larger than that needed for the E.I. approach. Such surrogate models can be referred to as (A.I.) models.

At least two types of data can be used to formulate or train these surrogate models. For example, a first type of data includes experimental data such as but not limited to, coupon strengths for different materials, stacking sequences, coupon geometries, loading conditions, test conditions, and the like. In some arrangements, the system identifies homogenized ply properties, fiber invariants, matrix invariants, and the like of a coupon from suitable physical/experimental data. Then, the system builds a finite element model of the coupon using the homogenized ply properties. The finite element model is used to determine $F_1$, which is the applied load that induces the first critical damage event. At least strain and stress values described herein in the different plies that correspond to the first critical damage event are the inputs to the surrogate models. The coefficient α may be determined using the following expression:

$$\alpha = F_u^{exp}/F_1 \quad (3)$$

where $F_u^{exp}$ is the strength of the coupon that was experimentally and physically measured. Thus, the surrogate model can be trained using simulation results corresponding to the first critical damage event and the final load as experimentally tested.

A second type of data includes data obtained as results of more detailed and more expansive simulations, offering accurate predictions. These simulations may model details of the damage mechanisms occurring in the fibers and in the matrix, at a very small scale. Thus, the surrogate model can be trained using simulation results corresponding to the first critical damage event and simulation results corresponding to the final load.

In some arrangements, the surrogate models can be developed with one of more of data from literature (e.g., data from scientific studies and experiments), data provided by the system, or customer simulation data (assuming appropriate permissions have been given). In some arrangements, while the developed surrogate models are available to all users of the prediction system 100 (as embodiment in software) for use, the content of the surrogate models are hidden and protected. For example, all users can enter input parameters to the surrogate models and obtain outputs based on the input parameters, but all users may be blocked or otherwise prevented from accessing the algorithm associated with the surrogate models. In some arrangements, the at least one surrogate model can be based on information stored in a material data management tool or software such as but not limited to, Granta Mi by Granta Material intelligence, MaterialCenter by MSC Software Corporation, Digimat-MX by e-Xstream.

In some examples, the surrogate models can be developed with data (e.g., simulation results) proprietary to a particular customer (referred to herein as the "original customer"). The surrogate models trained with the data proprietary to the original customer can be used by only the original customer and other customers with appropriate permissions, when using the software corresponding to the prediction system 100. In that regard, the surrogate models are presented in the software in an encrypted format, usable by a user who has the appropriate decryption key with a valid expiration time. This will give the original customer and the system the ability to control who is allowed to use the particular surrogate models trained with the data proprietary to the original customer.

As such, the surrogate models may have a limited domain of applicability in some examples. For example, the domains of applicability include but are not limited to, types of material, stacking sequences, coupon geometries, test/loading conditions with which the surrogate models have been trained or from which the surrogate models have been derived. The prediction system 100 may inform the user regarding the applicability of the method 700 to the problem that the user is trying to solve. As such, the method 700 may further include determining that a problem statement inputted by a user is not in a domain of applicability of the at least one surrogate model, by checking the problem statement against the domain of applicability of the prediction system 100. The user is informed (e.g., notified via a user output device of the interface 118) that the problem statement is not in the domain of applicability of the at least one surrogate model.

Figure 10:
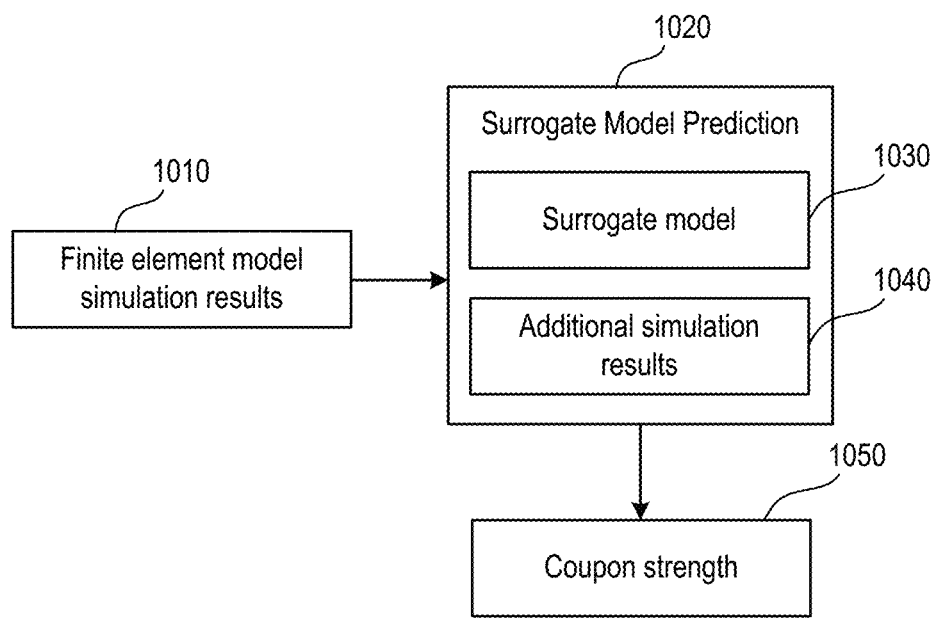
FIG. 10 is a diagram illustrating an example of using an additional finite element model to provide additional information to be inputted into a surrogate model.

In some arrangements, to improve the accuracy of the failure predictions, the surrogate models may be given as extra inputs the results obtained on a finite element model of a portion of a detailed model of the coupon run in the background. For example, the portion may correspond to a small region such as but not limited to, a small region around a hole of an open-hole coupon, to obtain more physical information with respect to the small region for improved accuracy in the predictions. In that regard, FIG. 10 is a diagram illustrating an example of using an additional finite element model to provide additional information to be inputted into a surrogate model. As shown, finite element model simulation results 1010 (e.g., the strain and stress distributions determined at 710) are fed (e.g., at 720) into at least one surrogate model 1030 for surrogate model prediction 1020. During the surrogate model prediction 1020 (e.g., during prediction of the coupon strength 1050, e.g., at 730), the AI circuit 110 may determine automatically or an operator may determine that additional insights into aspects (e.g., physics) of the composite material may be needed for more accurate prediction results. In response to such, the AI circuit 110 or the processing circuit 102 can generate a smaller model based on which additional FEA can be run to determine additional simulation results 1040. The smaller model refers to a model that is a portion of the model used for determining the first critical damage event at 710. The smaller model may be more detailed (e.g., having more mesh detail) as compared to the model used for determining the first critical damage event at 710 in some examples, to give the additional information. In some arrangements, the type of FEA simulation run to obtain the additional simulation results 1040 may be the same as or different from the type of FEA simulation run at 710. As such, the coupon strength 1050 can be determined based on a first FEA (obtaining the finite element model simulation results 1010), then the at least one surrogate model 1030, and additional simulation results 1040 executed after the prediction by the at least one surrogate model 1030 is initiated (while the prediction by the at least one surrogate model 1030 is running or between two sessions of prediction by the at least one surrogate model 1030).

In some arrangements, the system can determine variability of the final load. Based on the variability, the system can determine at least one of an A-basis value and a B-basis value of the final load. At least 99% of the population of coupon strength values (e.g., the final loads) are expected to equal or exceed the A-basis value bound with 95% confidence. At least 90% of the population of coupon strength values (e.g., the final loads) are expected to equal or exceed the B-basis value with 95% confidence.

The terms "system," "logic," "module," "data processing apparatus," or "computing device" encompasses all kinds of circuits, apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

The construction and arrangement of the systems and methods as shown in the various exemplary examples are illustrative only. Although only a few examples have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. Other substitutions, modifications, changes, and omissions can be made in the design, operating conditions and arrangement of the exemplary examples without departing from the scope of the present disclosure.

The present disclosure contemplates methods, systems and program products on any machine-readable media for accomplishing various operations. The examples of the present disclosure can be implemented using existing computer processors, or by a special purpose computer processor for an appropriate system, incorporated for this or another purpose, networked systems or by a hardwired system. Examples within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions. The machine-executable instructions can be executed on any type of computing device (e.g., computer, laptop, etc.) or can be embedded on any type of electronic device (e.g., a portable storage device such as a flash drive, etc.).

Although the figures can show a specific order of method steps, the order of the steps can differ from what is depicted. Also, two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision step.

What is claimed is:

1. A method for a computerized simulation platform to predict strength of a coupon of composite material, the method comprising:
    determining a first critical damage event and strain and stress distributions of the coupon corresponding to the first critical damage event by performing a finite element analysis (FEA) of a finite element model of the coupon, wherein the first critical damage event defines irreversible damage to the coupon, wherein determining the first critical damage event and the strain and stress distributions comprises:
        determining, by the FEA as a response to an applied load, ply strains in the coupon as the composite material is considered as homogenous;
        applying, at selected locations in the coupon, transfer functions to the ply strains to determine fiber strains and stresses and matrix strains and stresses;
        determining one or more failure criteria in the coupon based on the fiber strains and stresses and matrix strains and stresses; and
        modifying the applied load in response to determining that none of the one or more failure criteria crosses a respective threshold;
    receiving the strain and stress distributions corresponding to the first critical damage event as inputs to at least one surrogate model; and
    determining a final load corresponding to a final failure of the coupon using the at least one surrogate model with the strain and stress distributions corresponding to the first critical damage event as the inputs.

2. The method of claim 1, wherein the strain and stress distributions comprise fiber strains and stresses and matrix strains and stresses.

3. The method of claim 1, further comprising receiving orientations of plies of the coupon as inputs to the at least one surrogate model, wherein the final load is determined based on the strain and stress distributions and the orientations.

4. The method of claim 1, further comprising receiving at least one of strength of a matrix associated with the coupon and strength of fiber material in the coupon, wherein the final load is determined based on the strain and stress distributions and at least one of the strength of the matrix and the strength of the fiber material.

5. The method of claim 4, wherein the strength of the matrix comprises at least one of a critical matrix dilatational invariant and a critical matrix distortional invariant.

6. The method of claim 4, wherein the strength of the fiber material comprises a critical fiber distortional invariant.

7. The method of claim 1, wherein the at least one surrogate model comprises analytical formulas.

8. The method of claim 1, wherein the at least one surrogate model is determined using machine learning by an artificial neural network.

9. The method of claim 1, further comprising:
    determining that a problem statement inputted by a user is outside of a domain of applicability of the at least one surrogate model;
    notifying the user that the problem statement is outside of the domain of applicability of the at least one surrogate model.

10. The method of claim 1, wherein determining the final load comprises:
    determining variability of the final load; and
    based on the variability, determining at least one of an A-basis and a B-basis of the final load.

11. The method of claim 1, further comprising determining the at least one surrogate model based on at least one of physical experimental data and simulation results.

12. The method of claim 1, further comprising determining the at least one surrogate model based on information stored in a material data management tool or software.

13. The method of claim 1, wherein determining the final load corresponding to the final failure of the coupon using the at least one surrogate model comprises:
performing another FEA of another finite element model of a portion of the coupon to obtain additional simulation results; and
using the additional simulation results as additional inputs to the at least one surrogate model.

14. The method of claim 13, wherein the another FEA is performed in the background, simultaneously with determining the final load using the at least one surrogate model.

15. A non-transitory computer-readable medium having computer-readable instructions, such that when executed, causes a processor of a computerized simulation platform to predict strength of a coupon of composite material by:
determining a first critical damage event and strain and stress distributions of the coupon corresponding to the first critical damage event by performing a finite element analysis (FEA) of a finite element model of the coupon, wherein the first critical damage event defines irreversible damage to the coupon, wherein determining the first critical damage event and the strain and stress distributions comprises:
determining, by the FEA as a response to an applied load, ply strains in the coupon as the composite material is considered as homogenous;
applying, at selected locations in the coupon, transfer functions to the ply strains to determine fiber strains and stresses and matrix strains and stresses;
determining one or more failure criteria in the coupon based on the fiber strains and stresses and matrix strains and stresses; and
modifying the applied load in response to determining that none of the one or more failure criteria crosses a respective threshold;
receiving the strain and stress distributions corresponding to the first critical damage event as inputs to at least one surrogate model; and
determining a final load corresponding to a final failure of the coupon using the at least one surrogate model with the strain and stress distributions corresponding to the first critical damage event as the inputs.

16. The non-transitory computer-readable medium of claim 15, wherein the strain and stress distributions comprise fiber strains and stresses and matrix strains and stresses.

17. The non-transitory computer-readable medium of claim 15, wherein the processor is further configured to receive orientations of plies of the coupon as inputs to the at least one surrogate model, wherein the final load is determined based on the strain and stress distributions and the orientations.

18. A computerized simulation platform configured to predict strength of a coupon of a composite material, the computerized simulation platform comprises:
a processing circuit configured to:
determine a first critical damage event and strain and stress distributions of the coupon corresponding to the first critical damage event by performing a finite element analysis (FEA) of a finite element model of the coupon, wherein the first critical damage event defines irreversible damage to the coupon, wherein determining the first critical damage event and the strain and stress distributions comprises:
determining, by the FEA as a response to an applied load, ply strains in the coupon as the composite material is considered as homogenous;
applying, at selected locations in the coupon, transfer functions to the ply strains to determine fiber strains and stresses and matrix strains and stresses;
determining one or more failure criteria in the coupon based on the fiber strains and stresses and matrix strains and stresses; and
modifying the applied load in response to determining that none of the one or more failure criteria crosses a respective threshold;
receive the strain and stress distributions corresponding to the first critical damage event as inputs to at least one surrogate model; and
determine a final load corresponding to a final failure of the coupon using the at least one surrogate model with the strain and stress distributions corresponding to the first critical damage event as the inputs.

* * * * *